United States Patent Office 3,127,266
Patented Mar. 31, 1964

3,127,266
MATERIAL FOR ELECTROPHOTOGRAPHIC
REPRODUCTION
Oskar Süs, Wiesbaden-Biebrich, and Heinz Schlesinger, Wiesbaden, Germany, assignors, by mesne assignments, to Azoplate Corporation, Murray Hill, N.J.
No Drawing. Filed Aug. 5, 1959, Ser. No. 831,725
Claims priority, application Germany Aug. 9, 1958
28 Claims. (Cl. 96—1)

Among modern reproduction processes the electrophotographic process, also known as xerography, is becoming of increasing practical importance. This dry reproduction process is becoming of particular interest in certain fields, for example, office duplicating, and it consists in the application to a material, consisting of an electrically conductive support and a photoconductive insulating layer adherent thereto of an electrostatic charge which imparts to the insulating layer the property of light-sensitivity. Such light-sensitive material can be used for the production of images by electrophotographic means. It is exposed to light beneath a master, so that the electrostatic charge is leaked away in the parts of the layer struck by light. The invisible electrostatic image thereby produced is made visible (developed) by powdering over with finely divided, colored, synthetic resin and then made non-smearable and permanent (fixed) by the application to the support of heat by which means the resin is fused to the support.

Materials known for the preparation of the photoconductive (i.e. electrically conductive under the influence of light) insulating layer required for the aforedescribed process include selenium, sulphur, zinc oxide, and also organic substances such as anthracene or anthraquinone. Consideration has also been given to a method of preparation for the photoconductive insulating layers whereby the photoconductive substances in association with binders are dispersed in solvents and the resultant dispersions applied to electrically conductive supports, primarily metal foils, and dried. However, the photoelectrically sensitizable material thus obtained has not yet satisfied the extensive demands made of modern duplicating material in respect of range of use, reliability, simplicity in handling and, not least in importance, light-sensitivity and storage qualities.

It has now been found that if as photoconductive substances 1,3-diphenyl-tetrahydroimidazoles, corresponding to the general formulas:

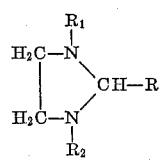

and

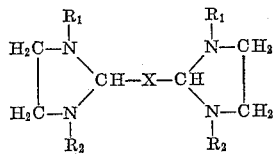

in which R is hydrogen, alkyl, alkenyl, aralkyl, aralkenyl, aryl, substituted aryl or a heterocyclic radical, $R_1$ and $R_2$ are phenyl or substituted phenyl radicals and X stands for a residue selected from the group consisting of aryl, a heterocyclic residue and a bis-arylamine residue, are used, unexpectedly successful photoelectrically sensitizable layers with a surprising range of practical applications are produced.

The term "alkenyl" is to be understood to cover univalent residues of unsaturated aliphatic hydrocarbons (olefins) e.g. ethenyl (vinyl), propenyl, butenyl, etc. "Aralkenyl" covers univalent residues of aryl-substituted alkenyl (analogous to aralkyl).

The 1,3-diphenyl-tetrahydroimidazoles to be used in accordance with the invention for the preparation of electrophotographic reproduction coatings have very good photoconductivity and are particularly suitable for the preparation of homogeneous coatings with unlimited shelf-life. The compounds are for the most part colorless. In the case of a number of the 1,3-diphenyl-tetrahydroimidazoles, their preparation from N,N'-diphenyl-ethylene diamine (dianilinoethane) and aldehydes is described in the literature. Those not described are obtained in simple manner by condensation at about 60° C., in methanol, with the addition of a little acetic acid, of equimolecular quantities of N,N'-diphenyl-ethylene diamine and of the aldehyde corresponding to the R in the above general formula. If the reaction is to be brought to completion, a slight excess of N,N'-diphenyl-ethylene diamine may be used.

For example, 1,3-diphenyl-tetrahydroimidazole is produced if a solution of 4.7 g. of N,N'-diphenyl-ethylene diamine in 65 cc. of methanol to which 2 cc. of 34 percent aqueous formaldehyde solution and a few drops of 50 percent acetic acid have been added is boiled for five minutes. The reaction product crystallizes even during heating and, after cooling, is separated by suction. After recrystallization from methanol, the 1,3-diphenyl-tetrahydroimidazole forms colorless crystals with a melting point of 123–124° C.

All the other 1,3-diphenyl-tetrahydroimidazoles to be used in accordance with the invention are prepared in an analogous manner, in some cases, with slight changes in the conditions being maintained during the reaction, e.g., in the quantity of acetic acid added, the duration of boiling, etc. For the preparation of the compounds corresponding to the above formula in which $R_1$ and $R_2$ are substituted phenyl radicals, the correspondingly substituted N,N'-diphenyl-ethylene diamines are reacted with an aldehyde.

The following table contains data on a number of examples of compounds of the above general formula to be used in accordance with the invention. In the table the diphenyl ethylene diamines used as reaction components are indicated by A or B or C or D, these letters standing for the following substances:

A for N,N'-diphenyl-ethylene diamine
B for N,N'-di-(p-tolyl)-ethylene diamine
C for N,N'-di-(p-chlorophenyl)-ethylene diamine
D for N,N'-di-(p-nitro-phenyl)-ethylene diamine For the 1,3-diphenyl-tetrahydroimidazoles produced from the reaction components, the successive numbers are given (see column 3) under which the corresponding constitutional formulae are shown below. Column 1 gives the ethylene-diamine reaction component, column 2 the aldehyde reaction component, column 4 the purifying agent from which the crude tetrahydroimidazole is recrystallized, column 5 the melting point in degrees centigrade and column 6 the color of the respective 1,3-diphenyl-tetrahydroimidazole.

| 1 | 2 | 3 | 4 | 5 | 6 |
|---|---|---|---|---|---|
| A, 4.7 g | formaldehyde, 2 c.c. | 1 | methanol | 123–124 | colorless. |
| A, 4.7 g | acetaldehyde, 0.9 g | 2 | do | 100–101 | Do. |
| A, 4.7 g | propionaldehyde, 1.2 g | 3 | do | 109–110 | Do. |
| A, 4.7 g | n-butyraldehyde, 1.4 g | 4 | do | 82 | Do. |
| A, 4.7 g | iso-butyraldehyde, 1.4 g | 5 | do | 92–96 | Do. |
| A, 4.7 g | crotonaldehyde, 2.1 g | 6 | do | 132 | Do. |
| A, 8.5 g | phenylacetaldehyde, 5.0 g | 7 | do | 86–87 | Do. |
| A, 4.7 g | hydrocinnamaldehyde, 2.7 g | 8 | do | 143–144 | Do. |
| A, 4.2 g | cinnamaldehyde, 2.9 g | 9 | methanol/benzene mixture. | 119–120 | Do. |
| A, 4.7 g | benzaldehyde, 2.1 g | 10 | methanol | 135 | Do. |
| A, 4.7 g | 4-tolylaldehyde, 2.4 g | 11 | do | 128–130 | Do. |
| A, 4.7 g | 4-methoxybenzaldehyde, 2.7 g | 12 | methanol/benzene mixture. | 163–164 | Do. |
| A, 9.4 g | 3,4-dimethoxybenzaldehyde, 6.6 g | 13 | ether | 88–89 | Do. |
| A, 7.0 g | 3-methoxy-4-hydroxybenzaldehyde, 5.3 g | 14 | methanol | 171 | Do. |
| A, 9.4 g | 3-hydroxy-4-methoxybenzaldehyde, 6.1 g | 15 | benzene/methanol mixture. | 169–170 | Do. |
| A, 9.4 g | 2-hydroxy-3-methoxybenzaldehyde, 6.1 g | 16 | do | 185–186 | Do. |
| A, 10.6 g | 2-hydroxy-benzaldehyde, 7.0 g | 17 | methanol | 117 | Do. |
| A, 10.6 g | 3-hydroxy-benzaldehyde, 7.0 g | 18 | do | 104–105 | Do. |
| A, 8.5 g | 4-hydroxy-benzaldehyde, 5.0 g | 19 | do | 145–146 | pale yellow. |
| A, 8.5 g | 2-hydroxy-5-methyl-benzaldehyde, 5.5 g | 20 | do | 142 | colorless. |
| A, 4.7 g | piperonal, 3.0 g | 21 | ethanol | 159–160 | Do. |
| A, 4.7 g | 2-chlorobenzaldehyde, 2.8 g | 22 | methanol | 125–126 | Do. |
| A, 4.7 g | 3-chlorobenzaldehyde, 2.8 g | 23 | do | 92–93 | Do. |
| A, 4.7 g | 4-chlorobenzaldehyde, 2.8 g | 24 | do | 155–156 | Do. |
| A, 9.4 g | 2,6-dichlorobenzaldehyde, 7.0 g | 25 | benzene/methanol mixture. | 203–204 | Do. |
| A, 4.7 g | 2-nitrobenzaldehyde, 3.0 g | 26 | do | 140 | yellow. |
| A, 4.7 g | 3-nitrobenzaldehyde, 3.0 g | 27 | do | 139–140 | Do. |
| A, 9.4 g | 4-nitrobenzaldehyde, 6.0 g | 28 | ethyl acetate/petroleum ether mixture. | 142 | Do. |
| A, 9.4 g | 2-nitro-3,6-dichlorobenzaldehyde, 8.8 g | 29 | ethanol | 162–163 | Do. |
| A, 9.4 g | 2-nitro-5-chlorobenzaldehyde, 7.4 g | 30 | benzene-methanol mixture. | 196–197 | Do. |
| A, 4.2 g | 4-dimethylaminobenzaldehyde, 3.5 g | 31 | methanol | 146–147 | colorless. |
| A, 2.3 g | 2-chloro-4-dimethylamino-benzaldehyde, 1.8 g | 32 | ethyl acetate | 177–178 | Do. |
| A, 1.1 g | 4-ethylaminobenzaldehyde, 0.75 g | 33 | methanol/benzene mixture. | 179 | Do. |
| A, 23.5 g | 4-diethylaminobenzaldehyde, 17.7 g | 34 | ethyl acetate | 160–161 | Do. |
| A, 1.1 g | N,N-di-(β-chlorethyl)-4-aminobenzaldehyde, 1.1 g | 35 | methanol/benzene mixture. | 162 | Do. |
| A, 2.2 g | N-(β-chlorethyl)-di-phenylamino-4-aldehyde, 2.6 g | 36 | do | 162–163 | Do. |
| A, 4.7 g | 4-(N-methyl-N-benzyl)-aminobenzaldehyde, 4.5 g | 37 | do | 122–124 | Do. |
| A, 2.4 g | 4-dibenzyl-aminobenzaldehyde, 3 g | 38 | ethyl acetate | 156–157 | Do. |
| A, 1.4 g | N-methyl-diphenylamino-4,4'-dialdehyde, 0.8 g | 39 | benzene/methanol mixture. | 213 | Do. |
| A, 4.7 g | diphenyl-4-aldehyde, 3.6 g | 40 | do | 144–145 | Do. |
| A, 4.7 g | 1-naphthaldehyde, 3.1 g | 41 | do | 190–191 | Do. |
| A, 4.7 g | 2-ethoxy-1-naphthaldehyde, 4 g | 42 | do | 189–190 | Do. |
| A, 4.7 g | anthraquinone-2-aldehyde, 4.7 g | 43 | do | 235 | orange. |
| A, 2.2 g | pyrene-3-aldehyde, 2.6 g | 44 | ethyl acetate | 204–205 | colorless. |
| A, 4.7 g | terephthalaldehyde, 2.7 g | 45 | benzene | 267–270 | Do. |
| A, 4.7 g | furfural, 1.9 g | 46 | methanol | 133–134 | Do. |
| A, 4.7 g | pyridine-2-aldehyde, 2.1 g | 47 | do | 175–176 | Do. |
| A, 4.8 g | pyridine-3-aldehyde, 2 g | 48 | ethanol | 144–145 | Do. |
| A, 2.4 g | pyridine-4-aldehyde, 1 g | 49 | do | 150–152 | Do. |
| A, 4.7 g | quinoline-2-aldehyde, 3.1 g | 50 | methanol | 158–160 | Do. |
| A, 2.4 g | quinoline-4-aldehyde, 1.6 g | 51 | benzene | 192–193 | Do. |
| A, 4.7 g | pyridine-2,6-dialdehyde, 1.3 g | 52 | toluene | 255–257 | Do. |
| A, 2.1 g | 9-ethyl-carbazole-3-aldehyde, 2.2 g | 53 | benzene/methanol mixture. | 180 | Do. |
| B, 1.3 g | benzaldehyde, 0.5 g | 54 | methanol/benzene mixture. | 167 | Do. |
| B, 2.4 g | 3,4-di-methoxybenzaldehyde, 1.7 g | 55 | benzene/methanol mixture. | 105 | Do. |
| B, 4.8 g | 4-dimethylamino benzaldehyde, 3 g | 56 | methanol/benzene mixture. | 189 | Do. |
| B, 2.4 g | 2-chloro-4-dimethylaminobenzaldehyde, 1.8 g | 57 | do | 158–160 | Do. |
| B, 1.2 g | 4-ethyl-aminobenzaldehyde, 0.75 g | 58 | do | 171–172 | Do. |
| B, 4.8 g | 4-diethylaminobenzaldehyde, 3.5 g | 59 | do | 146 | Do. |
| B, 1.1 g | N,N-di-(β-chlorethyl)-4-aminobenzaldehyde, 1.1 g | 60 | do | 152 | Do. |
| B, 2.4 g | N-(β-chlorethyl)-diphenylamino-4-aldehyde, 2.6 g | 61 | ethyl acetate | 165 | Do. |
| B, 2.4 g | N-methyl-N-(4'-ethoxyphenyl)-4-aminobenzaldehyde, 2.5 g | 62 | benzene/methanol mixture. | 107–108 | Do. |
| B, 3.6 g | 4-(N-methyl-N-benzyl)-aminobenzaldehyde, 3.4 g | 63 | methanol/benzene mixture. | 164 | Do. |
| B, 3.6 g | 4-dibenzylaminobenzaldehyde, 4.5 g | 64 | do | 192 | Do. |
| B, 2.4 g | 2-naphthaldehyde, 1.5 g | 65 | benzene/methanol mixture. | 176 | Do. |
| B, 2.4 g | pyridine-2-aldehyde, 1.1 g | 66 | do | 215 | Do. |
| B, 2.4 g | pyridine-3-aldehyde, 1.1 g | 67 | do | 169 | Do. |
| B, 2.4 g | pyridine-4-aldehyde, 1.1 g | 68 | do | 173 | Do. |
| B, 4.8 g | quinoline-2-aldehyde, 3.1 g | 69 | do | 186 | Do. |
| B, 2.4 g | quinoline-4-aldehyde, 1.6 g | 70 | methanol/benzene mixture. | 147 | Do. |
| C, 1.5 g | benzaldehyde, 0.5 g | 71 | benzene/methanol mixture. | 139 | Do. |
| C, 2.8 g | 3,4-dimethoxybenzaldehyde, 1.7 g | 72 | do | 119 | Do. |
| C, 1.8 g | 3-methyl-4-methyl-amino-benzaldehyde, 0.75 g | 73 | ethanol/benzene mixture. | 185–186 | Do. |
| C, 2.8 g | 4-dimethylaminobenzaldehyde, 1.5 g | 74 | methanol/benzene mixture. | 185 | Do. |

| 1 | 2 | 3 | 4 | 5 | 6 |
|---|---|---|---|---|---|
| C, 1.8 g | 2-chloro-4-dimethyl-amino-benzaldehyde, 0.9 g | 75 | methanol/benzene mixture. | 211 | colorless |
| C, 2.8 g | 4-diethylaminobenzaldehyde, 1.8 g | 76 | do | 174 | Do. |
| C, 2.8 g | N,N-di-(β-chlor-ethyl)-4-amino-benzaldehyde, 2.5 g | 77 | do | 181 | Do. |
| C, 2.8 g | 4-(N-methyl-N-benzyl)-amino-benzaldehyde, 2.3 g | 78 | do | 150 | Do. |
| C, 2.8 g | 4-dibenzyl-amino-benzaldehyde, 3 g | 79 | do | 187 | Do. |
| C, 1.4 g | N-methyl-N-(4′-ethoxy-phenyl)-4-amino-benzaldehyde, 1.3 g | 80 | do | 142–143 | Do. |
| C, 1.4 g | N-(β-chlorethyl)-diphenylamino-4-aldehyde, 1.3 g | 81 | ethyl acetate | 202–203 | Do. |
| C, 1.9 g | N-methyl-diphenylamino-4,4′-di-aldehyde, 0.8 g | 82 | benzene/methanol mixture. | 255–256 | Do. |
| C, 2.8 g | 2-naphthaldehyde, 1.5 g | 83 | do | 183–184 | Do. |
| C, 1 g | anthracene-9-aldehyde, 0.73 g | 84 | chloroform | 228–230 | light yellow. |
| C, 2.8 g | pyridine-2-aldehyde, 1.2 g | 85 | benzene/methanol mixture. | 179 | colorless. |
| C, 2.8 g | pyridine-3-aldehyde, 1.2 g | 86 | do | 122 | Do. |
| C, 2.8 g | pyridine-4-aldehyde, 1.2 g | 87 | do | 204 | Do. |
| C, 2.8 g | quinoline-2-aldehyde, 1.6 g | 88 | do | 199 | Do. |
| C, 2.8 g | quinoline-4-aldehyde, 1.6 g | 89 | methanol/benzene mixture. | 175 | Do. |
| D, 0.6 g | benzaldehyde, 0.5 g | 90 | | 269 | yellow. |

The formulae of compounds 1 to 90 are as follows:

*Formula 1*

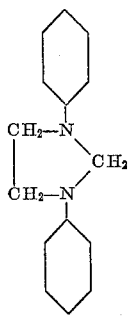

*Formula 2*

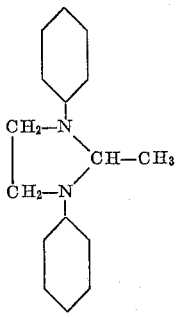

*Formula 3*

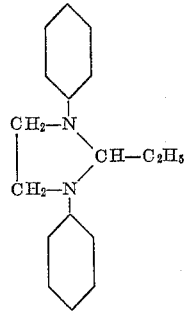

*Formula 4*

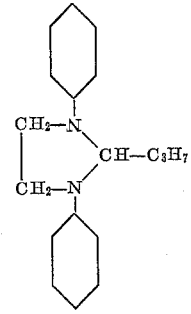

*Formula 5*

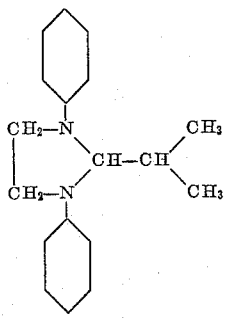

*Formula 6*

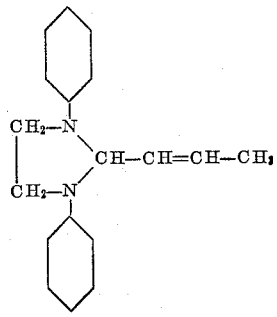

*Formula 7*

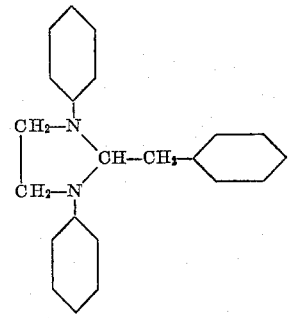

*Formula 8*

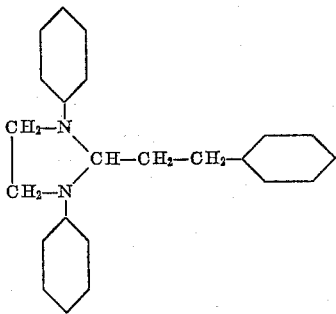

*Formula 9*
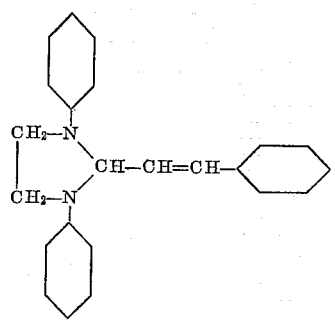
*Formula 10*
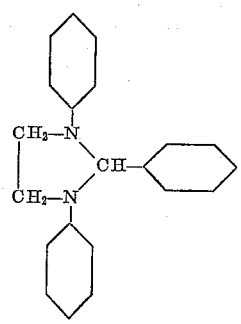
*Formula 11*
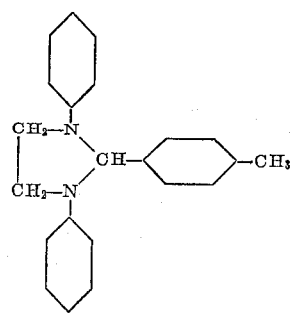
*Formula 12*
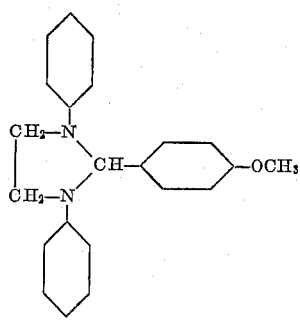
*Formula 13*
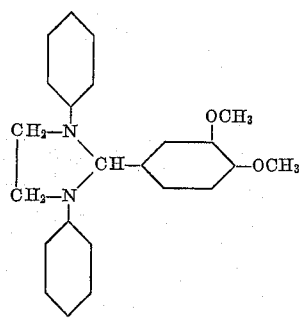
*Formula 14*
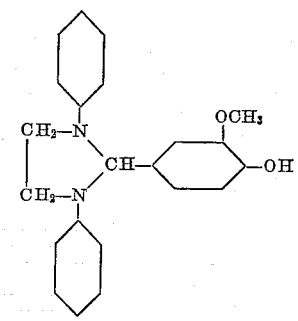
*Formula 15*
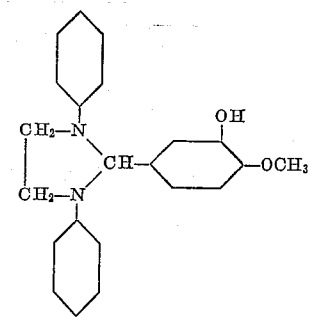
*Formula 16*
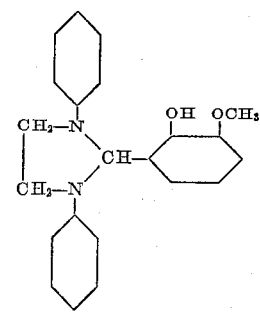
*Formula 17*
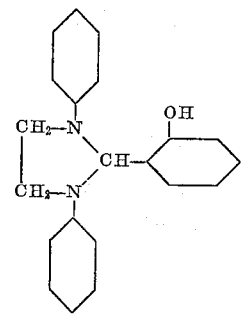
*Formula 18*
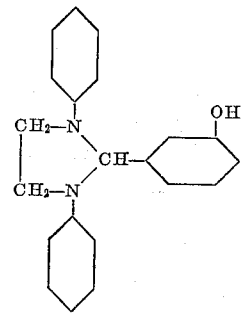

Formula 19
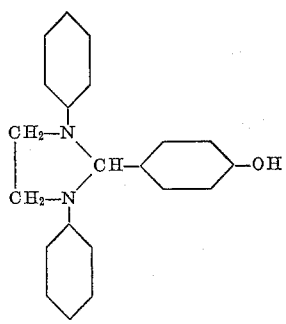
Formula 20
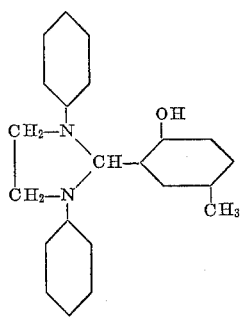
Formula 21
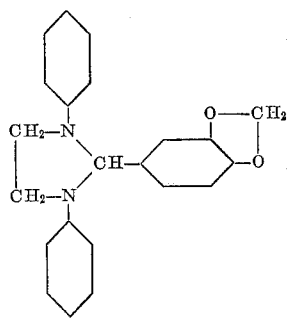
Formula 22
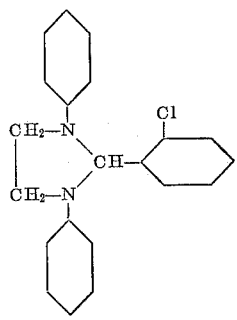
Formula 23
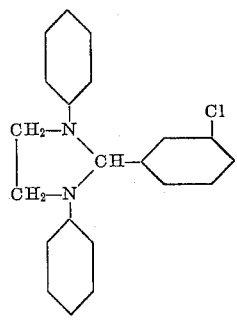
Formula 24
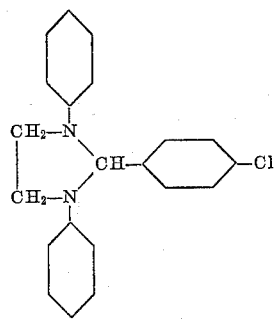
Formula 25
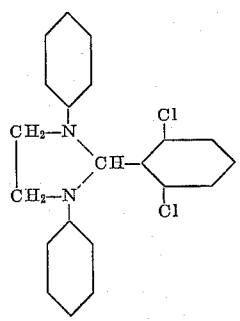
Formula 26
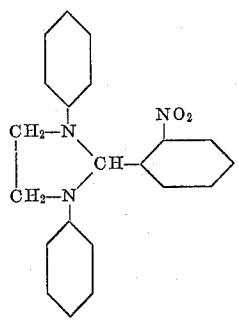
Formula 27
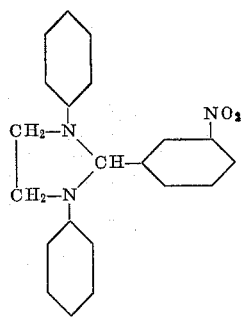
Formula 28
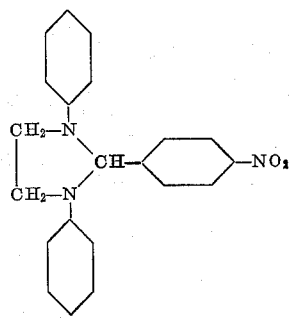

Formula 29
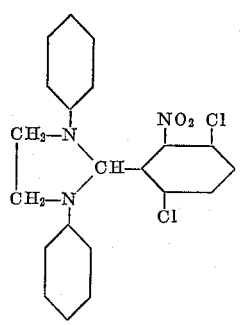
Formula 30
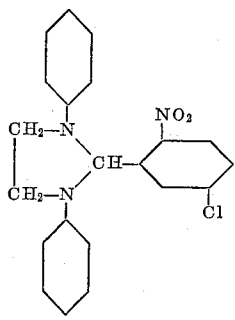
Formula 31
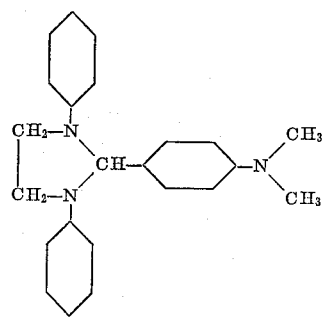
Formula 32
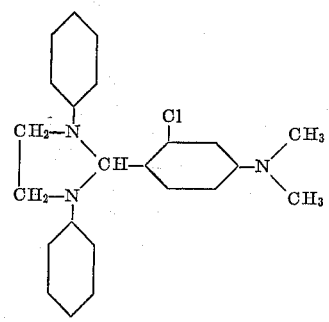
Formula 33
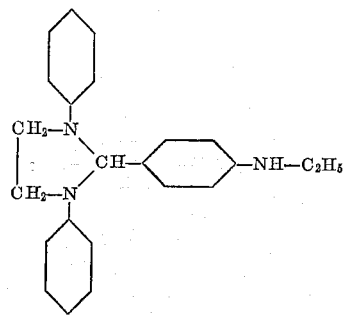
Formula 34
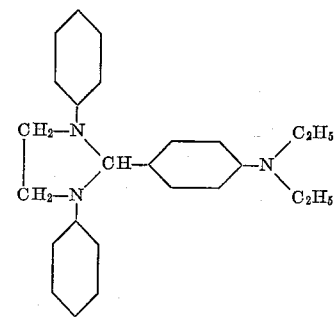
Formula 35
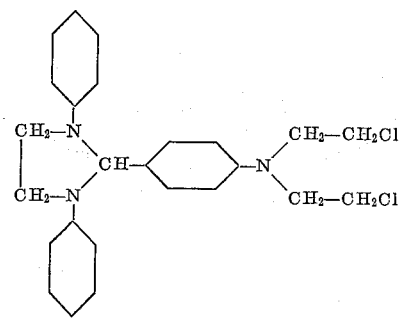
Formula 36
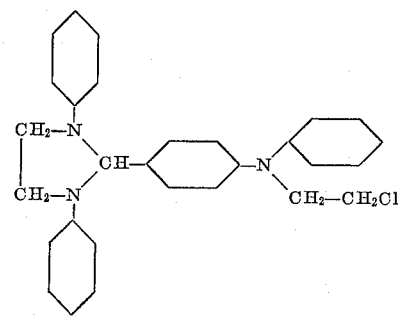
Formula 37
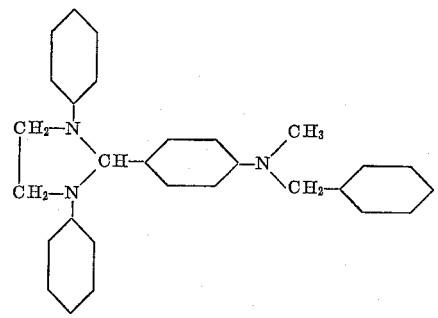
Formula 38
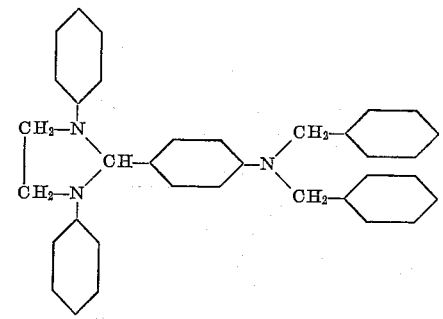

Formula 39
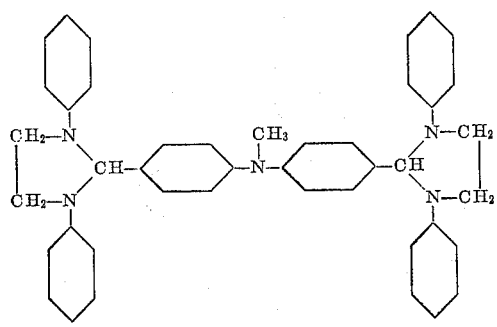
Formula 40
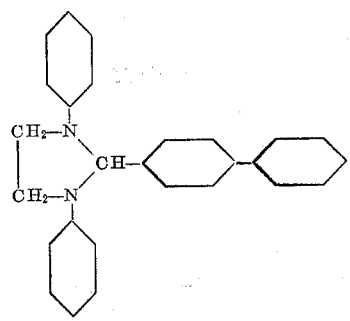
Formula 41
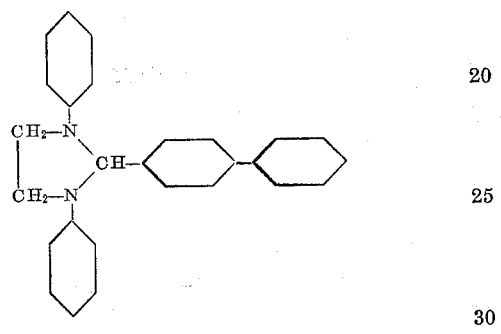
Formula 42
Formula 43
Formula 44
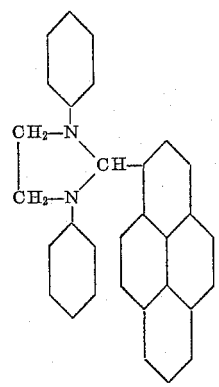
Formula 45
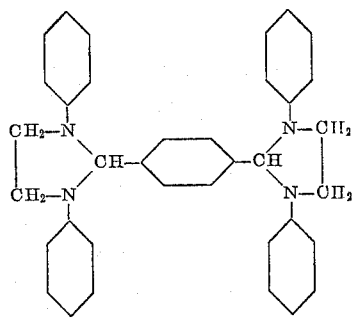
Formula 46
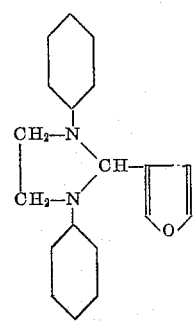
Formula 47
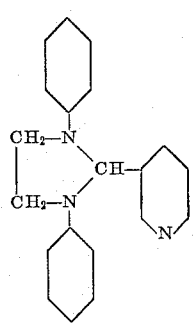
Formula 48

15
*Formula 49*
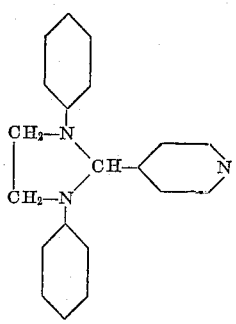
*Formula 50*
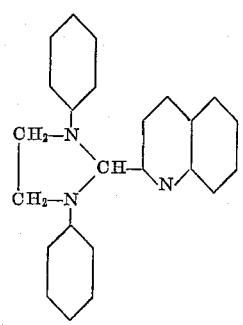
*Formula 51*
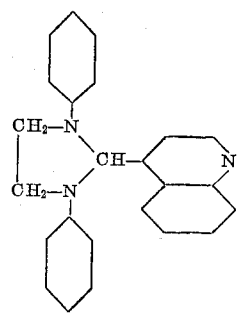
*Formula 52*
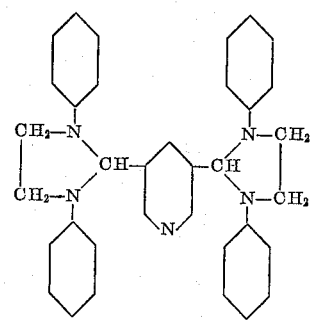
*Formula 53*
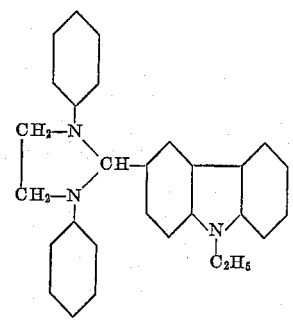
16
*Formula 54*
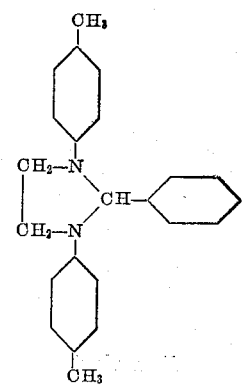
*Formula 55*
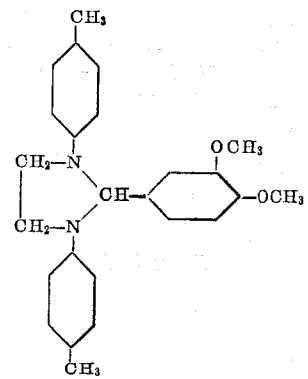
*Formula 56*
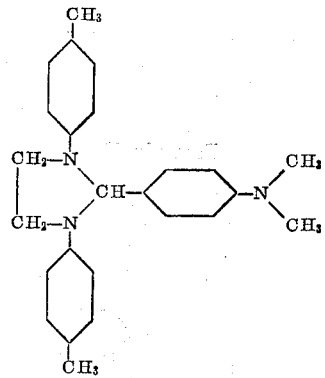
*Formula 57*
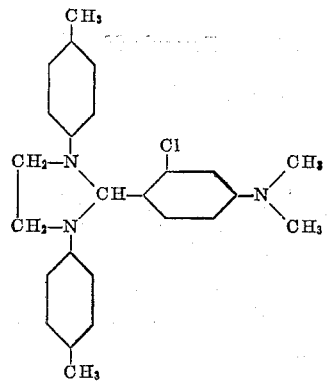

17
Formula 58
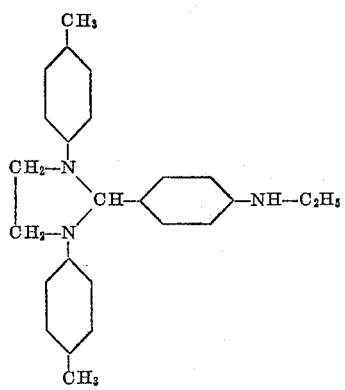
Formula 59
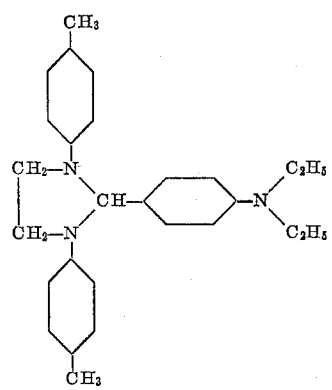
Formula 60
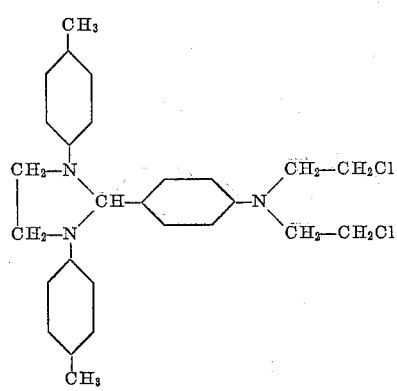
Formula 61
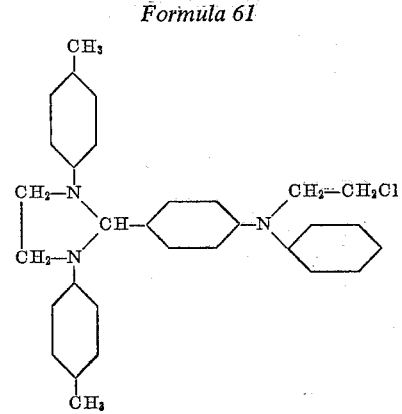
18
Formula 62
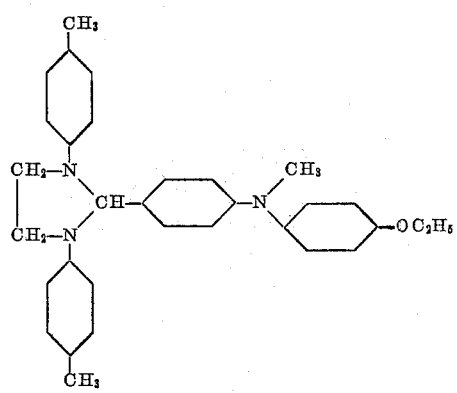
Formula 63
Formula 64
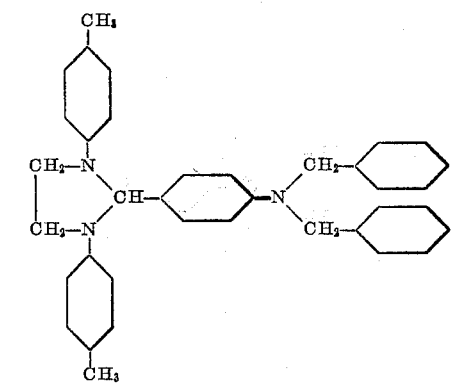
Formula 65

Formula 66
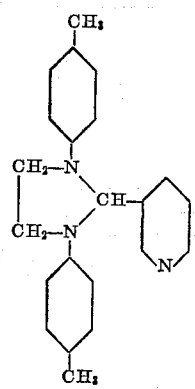
Formula 67
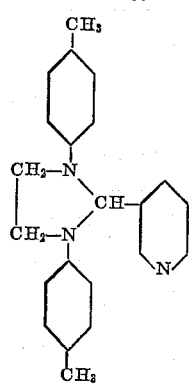
Formula 68
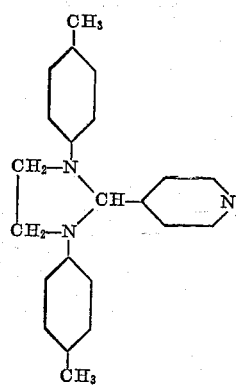
Formula 69
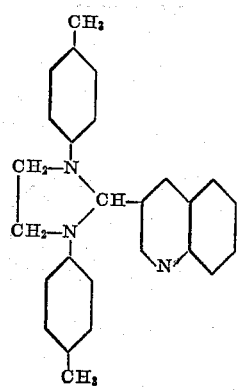
Formula 70
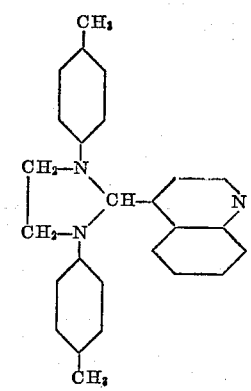
Formula 71
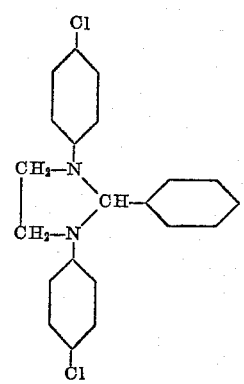
Formula 72
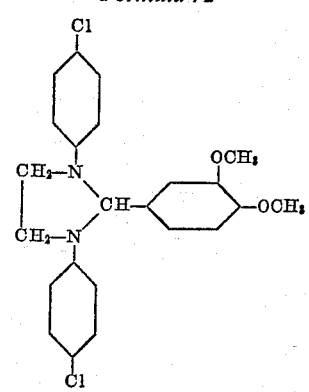
Formula 73
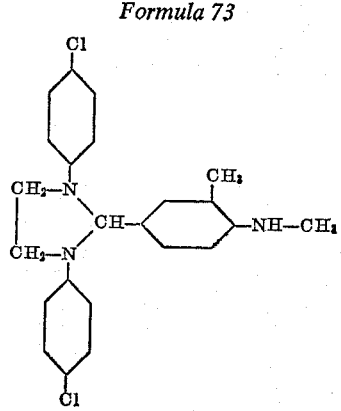

21
*Formula 74*
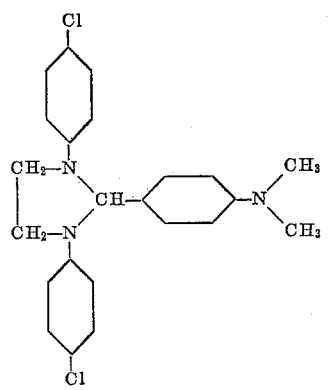
*Formula 75*
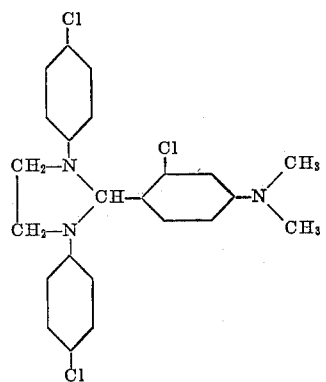
*Formula 76*
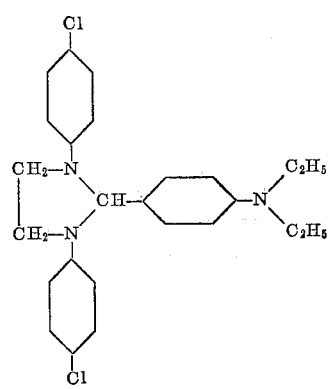
*Formula 77*
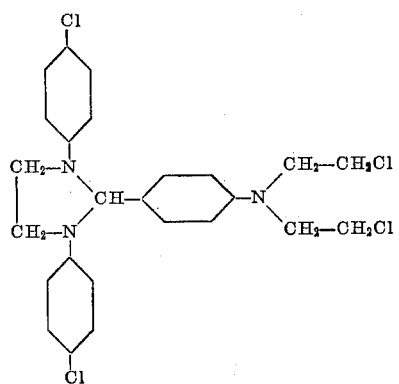
22
*Formula 78*
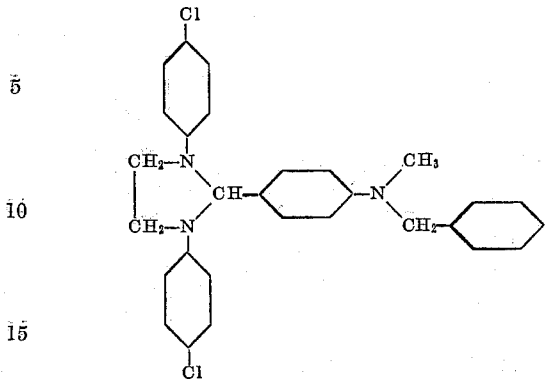
*Formula 79*
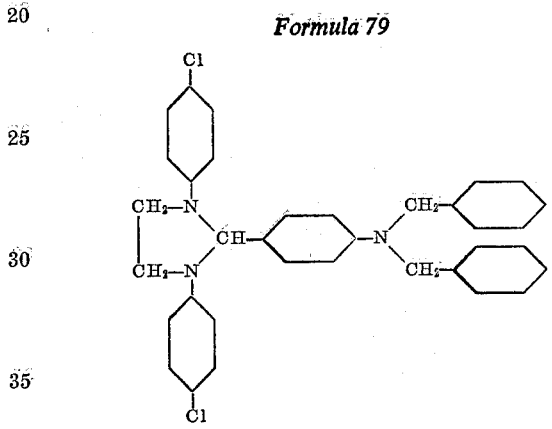
*Formula 80*
*Formula 81*
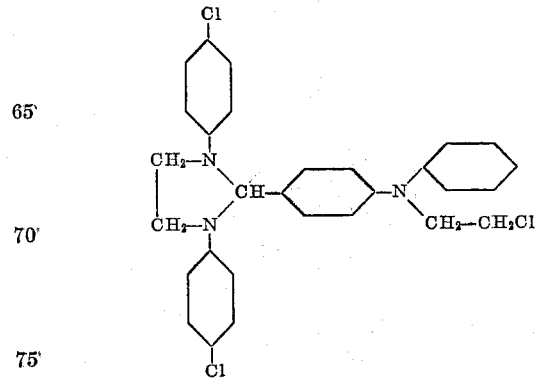

23
Formula 82
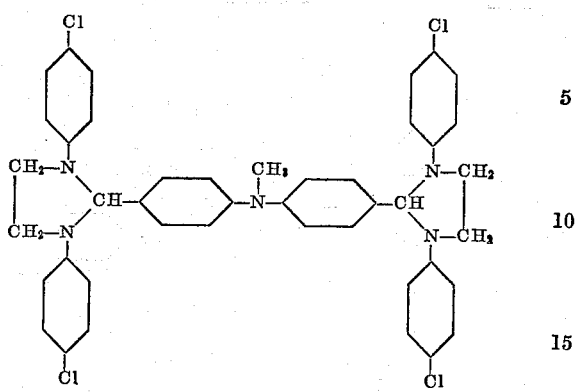
Formula 83
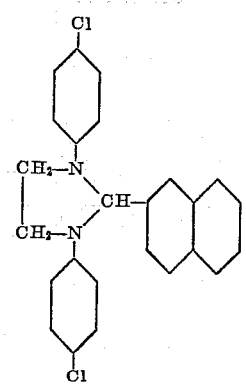
Formula 84
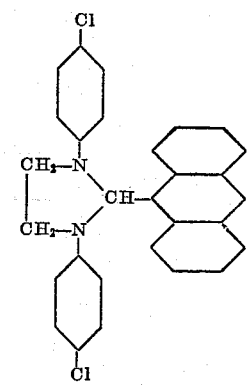
Formula 85
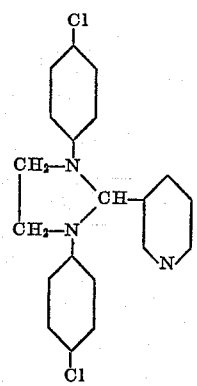
24
Formula 86
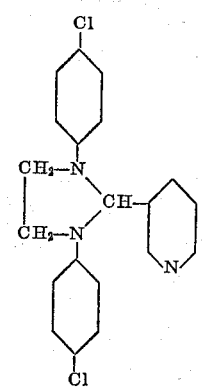
Formula 87
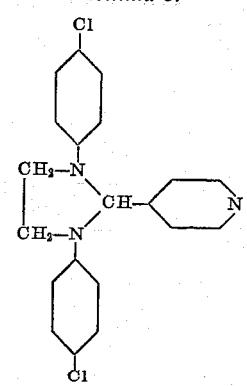
Formula 88
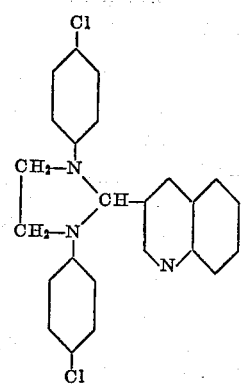
Formula 89
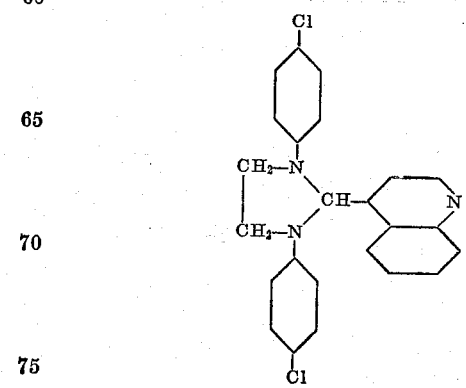

*Formula 90*

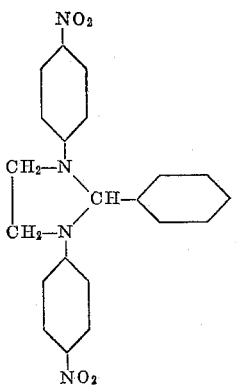

For the preparation of the photoconductive insulating layers, it is advantageous for the tetrahydroimidazoles which are employed in accordance with the invention to be used in solution with organic solvents, e.g., benzene, acetone, methylene chloride, ethylene glycolmonomethylether and other mixtures of such solvent. Mixtures of several of the tetrahydroimidazoles can also be used for the preparation of the electrophotographic coating, or the tetrahydoimidazoles accordant with the invention in association with other, preferably organic, photoconductive substances.

As has further been discovered, it can be an advantage in the production of the photoconductive insulating layers for organic colloids to be used in association with the compounds corresponding to the general formula given above. The following may appropriately be mentioned: natural and synthetic resins, e.g., balsam resins, phenol resins modified with colophony and other resins of which colophony constitutes the major part, coumarone resins and indene resins and the substances covered by the collective term "synthetic lacquer resins," which according to the Kunststofftaschenbuch (Plastics Pocket Book), published by Saechtling-Zebrowski (11th edition, 1955, page 212 onwards), include processed natural substances such as cellulose ether; polymers such as polyvinyl chlorides, polyvinyl acetate, polyvinyl acetals, polyvinyl alcohols, polyvinyl ethers, polyacrylic and polymethacrylic esters, as also polystyrene and isobutylene; polycondensates, e.g., polyesters, such as phthalate resins, alkyd resins, maleic acid resins, maleic acid/colophony/mixed esters of higher alcohols, phenol-formaldehyde resins, particularly colophony-modified phenol-formaldehyde condensates, urea-formaldehyde resins, melamine-formaldehyde condensates, aldehyde resins, ketone resins of which particular mention is to be made of AW 2 resins of the Badische Anilin- und Sodafabrik, xylene-formaldehyde resins and polyamides; and polyadducts, such as polyurethanes.

If the 1,3-diphenyl-tetrahydroimidazoles to be used in accordance with the invention are used in association with organic colloids, the proportion of resin to photoconductive substance can vary very greatly. The use of mixtures of approximately equal parts of resin and tetrahydroimidazole has been found advantageous. If such mixtures of approximately equal parts of resin and 1,3-diphenyl-tetrahydroimidazole are used, their solution in most cases gives homogeneous, transparent, mostly colorless layers after drying which are considered solid solutions.

The base materials used as electroconductive supports may be any that satisfy the requirements of xerography, e.g., metal or glass plates, paper or plates or foils made of electrically conductive resins or plastic resins, so-called synthetics. If paper is to be used as support for the photoconductive layer, pretreatment of the paper for the photoconductive insulating layers against penetration of the coating solution is advisable, e.g., with methyl-cellulose in aqueous solution or polyvinyl alcohol in aqueous solution or with a solution in acetone and methylethylketone of a copolymer of acrylic acid methyl ester and acrylonitrile or with solutions of polyamides in aqueous alcohols. Aqueous dispersions of substances suitable for the pretreatment of the paper surface may also be used.

The solutions of the compounds of the tetrahydroimidazole class to be used in accordance with the invention, with or without the resins, are applied to the supports in the usual manner, for example by spraying, by direct application, by whirl coating, etc., and then dried so as to produce a homogeneous photoconductive layer on the electro-conductive support.

The layers are in themselves not light-sensitive. However, after an electrostatic potential has been applied, i.e., after the layer has been charged positively or negatively by means of, for example, a corona discharge, it is light-sensitive and can be used with long-wave U.V. light of 3600–4200 A. for electro-photographic image-production. Very short exposure under a master to a high-pressure mercury lamp will give good images.

The layers corresponding to the invention have, even when charged, very little sensitivity to the visible range of the spectrum. However, the further discovery has been made that the spectral sensitivity of the photoconductive layer can be extended by means of sensitizers into the visible part of the spectrum. The amount of sensitizer to be added to the photoconductive substance is 1–3%. Dyestuffs in particular are suitable for this purpose and for their readier identification the number is given under which they are listed in Schultz' "Farbstofftabellen" (7th edition, 1st vol., 1931). The following are given as examples of effective sensitizers: triarylmethane dyestuffs such as brilliant green (No. 760, p. 314), Victoria blue B (No. 822, p. 347), methyl violet (No. 783, p. 327), crystal violet (No. 785, p. 329), acid violet 6B (No. 831, p. 351); xanthene dyestuffs, namely rhodamines, such as rhodamine B (No. 864, p. 365), rhodamine 6G (No. 866, p. 366), rhodamine G extra (No. 865, p. 366), sulphorhodamine B (No. 863, p. 364) and true acid eosin G (No. 870, p. 368), as also phthaleins such as eosin S (No. 883, p. 375), eosin A (No. 881, p. 374), erythrosin (No. 886, p. 376), phlexin (No. 890, p. 378), Rose Bengal (No. 889, p. 378), and fluorescein (No. 880, p. 373); thiazine dyestuffs such as methylene blue (No. 1038, p. 449); acridine dyestuffs such as acridine yellow (No. 901, p. 383), acridine orange (No. 908, p. 387) and trypaflavine (No. 906, p. 386); quinoline dyestuffs such as pinacyanol (No. 924, p. 396) and cryptocyanine (No. 927, p. 397); quinone dyestuffs and ketone dyestuffs such as alizarin (No. 1141, p. 49), alizarin red S (No. 1145, p. 502) and quinizarine (No. 1148, p. 504); cyanine dyestuffs, e.g., cyanine (No. 921, p. 394) and chlorophyll.

The production of images by electrophotographic means is carried out as follows: When the photoconductive layer has been charged, by means of, for example, a corona discharge with a charging apparatus maintained at 6000–7000 volts, the support, e.g., paper or aluminum foil or plastic foil, with the sensitised layer, is exposed to light under a master or by episcopic or disascopic projection and is then dusted over in known manner with a resin powder colored with carbon black. The image that now becomes visible can easily be wiped off. It therefore has to be fixed; it can, for example, be briefly heated to about 120° C., or according to the fusion temperature of the developer used it can be exposed to infra-red radiation. The temperature required is less if the heat treatment is carried out in the presence of vapors of solvents such as trichlorethylene, carbon tetrachloride or ethyl alcohol. The fixing of the powder image can also be done by steam treatment. From positive masters, positive images characteristed by good contrast are produced.

A particular advantage of the electrophotographic images prepared in accordance with the invention consists in the fact that after being fixed these images can be converted into a printing plate, if the support, e.g., paper or plastic foil, is wiped over with a solvent for the photoconductive layer, e.g., alcohol or acetic acid. This treatment removes the image-free parts of the layers, so that the support can now be wetted with water. It is then inked up in known manner with greasy ink, and this ink adheres only to the image parts. In this way positive printing plates are obtained which can be set up in an offset machine and used for printing. Very long runs are obtained.

If transparent supports are used, the electrophotographic images can also be used as masters for the production of further copies on any sort of light-sensitive sheets. In this respect the photoconductive compounds to be used as provided by the invention are superior to the substances used hitherto, such as selenium or zinc oxide, inasmuch as the latter give only cloudy layers not capable of further reproduction, because solid solutions cannot be produced with these materials, and only suspensions are possible.

If translucent supports are used for photoconductive layers such as are provided by the invention, reflex images can be produced also. The possibility of a reflex copy is also an advantage over the known art.

Moreover the photoconductive layers prepared in accordance with the invention have a further important advantage in that they can be charged positively as well as negatively. With positive charging the images are particularly good and the evolution of ozone, which with negative charging is very copious and because it is injurious to health requires special measures, such as the installation of fans, is scarcely to be detected.

The invention will be further illustrated by reference to the following specific examples:

(1) 1 g. of 1,3-diphenyl-2-4'-dimethylaminophenyl)-tetrahydroimidazole corresponding to Formula 31 and 1 g. of non-hydrolyzed ketone-aldehyde condensation resin, e.g. the product prepared by the Chemische, Werke Hüls AG, Marl, and marketed under the trade name "Kunstharz AP," are dissolved in 30 ml. of ethylene glycolmonomethylether or benzene. About 15 ml. of this solution are applied evenly to a paper foil (size DIN A4). After evaporation of the solvent, a firmly adherent coating is left on the paper foil and this is electrostatically charged. By exposure of the electrically charged coating under a master, either by the contact process or by diascopic or episcopic projection, powdering over with colored powder developer (carbon-black/resin mixture) and subsequent heating, i.e., by the electrophotographic method known per se, an image of the master is obtained.

(2) The procedure of which details are given in Example 1 is followed but for the preparation of the electrophotographic coating on paper 1 g. of 1,3-diphenyl-2-styryl-tetrahydroimidazole corresponding to Formula 9 is used as the photoconductive substance instead of the tetrahydroimidazole substance used in Example 1. The image obtained has good contrast. The tetrahydroimidazoles which correspond to Formulae 1–8 are used with equally good results.

(3) The procedure described in Example 1 is altered to the extent that 1 g. of 1,3-diphenyl-2-styryl-tetrahydroimidazole (Formula 9) is used as photoconductive substance and, instead of the Kunstharz AP, 1 g. of maleic acid resin, e.g. the resin marketed by the Reichhold-Chemie AG, Hamburg, under the registered trademark "Beckacite" K105, is used. Images prepared with this electrophotographic layer are sharp in outline and rich in contrast.

(4) 0.7 g. of 1,3-diphenyl-2-(4'-dimethylaminophenyl)-tetrahydroimidazole corresponding to Formula 31, the same quantity of 1,3-diphenyl-2-(4'-diethylaminephenyl)-tetrahydroimidazole corresponding to Formula 34 and of 1,3 - diphenyl-2-[4'-(N-methyl-N-benzyl)-aminophenyl]-tetrahydroimidazole corresponding to Formula 37 are dissolved in 30 ml. of ethylene glycolmonomethylether. About 15 ml. of this solution are applied to a paper foil of size DIN A4, the surface of which has been pretreated against the penetration of organic solvents. The coated solution is dried. With the now coated paper foil, electrophotographic images can be prepared as described in Example 1. The above named compounds can be replaced by approximately equal quantities of the tetrahydroimidazoles which correspond to Formulae 32, 35 and 39.

(5) 1 g. of 1,3-di-(p-tolyl)-2-(4'-dibenzylaminophenyl)-tetrahydroimidazole corresponding to Formula 64 and 1 g. of coumarone resin, e.g., the "Cumaronharz 701/70" marketed by the Gesellschaft für Teerverwertung, Duisburg-Meiderich, are dissolved in 30 ml. of benzene. Two applications of 15 ml. each of this solution are made consecutively to sheet of transparent paper (80 g.s.m.) of size DIN A4 so that a coating is formed. After evaporation of the solvent the coating is dried under an infrared radiator; it then adheres firmly to the surface of the paper foil. Images with contrast effect that can be used as photoprinting masters are produced electrophotographically on this coating. If the tetrahydroimidazole of Formula 64 is replaced by one of the compounds that correspond to Formulae 54–63 and 67–70, equally good images are obtained.

(6) 1 g. of 1,3-di-(4'-chlorophenyl)-tetrahydroimidazole corresponding to Formula 71 and 1 g. of non-hydrolyzed ketone-aldehyde condensation resin, e.g., the product prepared by Chemische Werke Hüls AG, Marl and marketed under the trade-name "Kunstharz AP," are dissolved in 30 ml. of ethylene glycolmonomethylether. 0.02 g. of ethly violet (Schultz "Farbstofftabellen," 7th edition, 1st vol., No. 787) is added and this solution is applied to paper which by means of a precoat has been rendered incapable of being penetrated by organic solvents. After evaporation of the solvent, homogeneous coating is left on the paper which adheres firmly to the surface thereof. The coated paper is provided in known manner with a positive or negative electrostatic charge and the paper thus sensitized is exposed under a positive master to, e.g., the light of a 100-watt incandescent lamp at a distance of 15 cm. for one second. The exposed surface is then powdered over with a resin powder colored with carbon-black, and the latent positive image thus made visible is fixed by treatment with trichloroethylene vapor.

Instead of the above named tetrahydroimidazole corresponding to Formula 74, the tetrahydroimidazoles corresponding to Formulae 71–73 and 75–90 may be used for the preparation of the electrophotographic coating to produce equally good images.

(7) 1 g. of 1,3-diphenyl-2-(4'-dimethylaminophenyl)-tetrahydroimidazole corresponding to Formula 31 and 1 g. of 1,3-diphenyl-2-(4'-dibenzylamino-phenyl)-tetrahydroimidazole corresponding to Formula 38 are dissolved in 30 ml. of ethylene glycolmonomethylether and about 15 ml. of this solution are applied to a sheet of paper of size DIN A4, the surface of which has been pretreated against the penetration of organic solvents. As the coated solution dries, a homogeneous photoconductive insulating layer is formed. Electrophotographic images can be prepared with the coated paper by the process described in Example 1. If a sheet of paper is laid upon the nonfixed image in carbon-black/resin powder and recharging by means of a corona discharge is carried out, the resin/carbon-black image is transferred to the paper, upon which a mirror image is produced. If the carbon-black/resin image is transferred to transparent paper or to a transparent plastic foil, the image obtained may be further copied, for example upon diazo photoprinting paper.

(8) 2 g. of 1,3-diphenyl-2-(4'-dimethylamino-phenyl)-tetrahydroimidazole corresponding to Formula 31 and 2 g. of resin-modified maleic acid resin, e.g., the product marketed by the Reichhold-Chemie AG, Hamburg, under the registered trademark "Beckacite" K125, are dissolved in 60 ml. of benzene. The solution is applied to a paper foil prepared in accordance with one of U.S. Patents Nos. 2,534,650; 2,681,617 and 2,559,610; or to an aluminium foil, the surface of which has been degreased. After evaporation of the solvent a homogeneous photoconductive coating is left which adheres firmly to the support used. On the coated foil, images with very good contrast effect are produced electrophotographically; they are fixed by heating and then converted into a printing plate by a process according to which the surface of the support that carries the fixed image is wiped over with 96% alcohol, washes well with water and inked up with 1% phosphoric acid and greasy ink. Positive printing plates are obtained which can be set up in an offset machine and used for printing.

(9) 0.5 g. of 1,2,3-triphenyl-tetrahydroimidazole corresponding to Formula 10 and 0.5 g. of ketone resin, e.g., the product prepared by the Chemische Werke Tüls 4G, Marl, and marketed under the trade-name "Kunstharz SK," are dissolved in 15 ml. of benzene. The solution is applied to paper and dried. After the coated paper has been negatively charged by means of a corona discharge, it is exposed under a positive master and powdered over in known manner with a resin powder colored with carbon-black. The positive image produced is fixed by heating. It is characterised by good contrast effect. For the preparation of the photoconductive insulating layer the tetrahydroimidazoles corresponding to Formulae 11–30 may be used instead of the tetrahydroimidazole corresponding to Formula 10.

(10) 0.5 g. of 1,3-di-(p-tolyl)-2-[quinolyl-(2'-)]-tetrahydroimidazole corresponding to Formula 69 and 0.5 g. of zinc resin, e.g. the product marketed by Robert Kraemer, Bremen, under the registered trademark "Erkazit Zinkharz 165," are dissolved in 15 ml. of benzene. The solution is applied to paper and dried. After negative charging by means of a corona discharge, the paper is exposed under a positive master to the light of a mercury lamp and powdered over with a resin powder colored with carbon-black. A positive image is produced which is fixed by heating.

(11) 1 g. of 1,3-diphenyl-2-(N-β-chloroethyl-N-phenyl-4'-aminophenyl)-tetrahydroimidazole corresponding to Formula 36 and 1 g. of non-hydrolyzed ketone-aldehyde condensation resin, e.g. the product manufactured by the Chemische Werke Hüls AG, Marl, and marketed under the trade-name "Kunstharz AP," are dissolved in 30 ml. of benzene. About 15 ml. of this solution are evenly distributed upon a sheet of paper of size DIN A4. After evaporation of the solvent a firmly adherent coating remains on the paper. With the coated paper, electrophotographic images are produced by the method described in Example 1. If a tetrahydroimidazole corresponding to one of Formulae 40–53 is used for the preparation of the coating solution instead of the tetrahydroimidazole corresponding to Formula 36, equally good images are obtained.

(12) 10 g. of after-chlorinated polyvinyl chloride, e.g. the product marketed by the Dynamit-Actien-Gesellschaft vormals Alfred Nobel & Co., Troisdorf, Werk Rheinfelden, under the registered trademark "Rhenoflex," are dissolved in 100 g. of methyl-ethyl-ketone. To this solution are added firstly 10 g. of 1,3-diphenyl-2-(4'-diethyl-amino-phenyl)-tetrahydroimidazole corresponding to Formula 34 dissolved in 50 g. of toluene and then 0.015 g. of rhodamine B extra (Schultz "Farbstofftabellen," 7th edition, 1st vol., No. 864) dissolved in 2 g. of methanol. The solution thus obtained is coated upon paper by means of a hopper device. After the coated solution has dried to a firmly adherent homogeneous layer, electrophotographic direct images are produced on the paper in the manner described in Example 1. Light-sensitivity is good. Episcopic projection from double-sided texts gives images rich in contrast.

It will be obvious to those skilled in the art that many modifications may be made within the scope of the present invention without departing from the spirit thereof, and the invention includes all such modifications.

What is claimed is:
1. An electrophotographic material comprising a conductive support layer and a photoconductive insulating layer, the latter comprising at least one compound corresponding to the formulas:

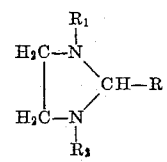

and

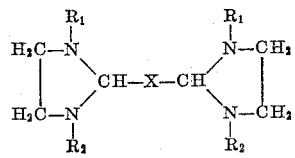

in which R is selected from the group consisting of hydrogen, alkyl, alkenyl, aralkyl, aralkenyl, aryl and heterocyclic groups, $R_1$ and $R_2$ are phenyl groups and X is selected from the group consisting of arylene, a heterocyclic group and a bis-arylamine group.

2. An electrophotographic material according to claim 1 in which the photoconductive layer contains a dyestuff sensitizer.

3. An electrophotographic material according to claim 1 in which the photoconductive layer contains an organic colloid.

4. An electrophotgraphic material comprising a conductive support layer and a photoconductive insulating layer, the latter comprising a compound having the formula

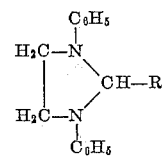

in which R is an alkyl group.

5. An electrophotographic material comprising a conductive support layer and a photoconductive insulating layer, the latter comprising a compound having the formula

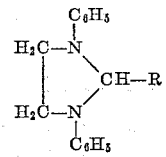

in which R is an alkenyl group.

6. An electrophotographic material comprising a conductive support layer and a photoconductive insulating layer, the latter comprising a compound having the formula

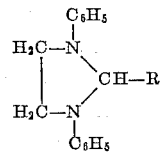

in which R is an aralkyl group.

7. An electrophotographic material comprising a conductive support layer and a photoconductive insulating layer, the latter comprising a compound having the formula

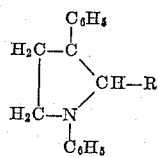

in which R is an aralkenyl group.

8. An electrophotographic material comprising a conductive support layer and a photoconductive insulating layer, the latter comprising a compound having the formula

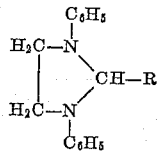

in which R is an aryl group.

9. An electrophotographic material comprising a conductive support layer and a photoconductive insulating layer, the latter comprising a compound having the formula

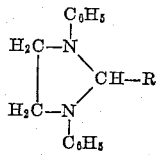

in which R is a heterocyclic group.

10. An electrophotographic material comprising a conductive support layer and a photoconductive insulating layer, the latter comprising a compound having the formula

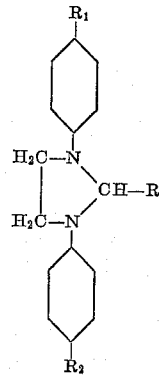

in which R is an aryl group and $R_1$ and $R_2$ are lower alkyl groups.

11. An electrophotographic material comprising a conductive support layer and a photoconductive insulating layer, the latter comprising a compound having the formula

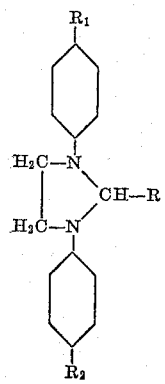

in which R is a heterocyclic group and $R_1$ and $R_2$ are lower alkyl groups.

12. An electrophotographic material comprising a conductive support layer and a photoconductive insulating layer, the latter comprising a compound having the formula

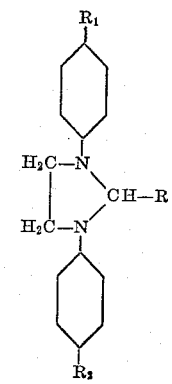

in which R is an aryl group and $R_1$ and $R_2$ are halogen.

13. An electrophotographic material comprising a conductive support layer and a photoconductive insulating layer, the latter comprising a compound having the formula

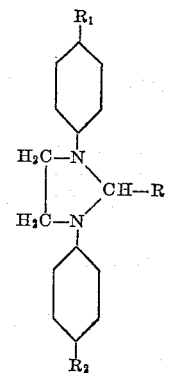

in which R is a heterocyclic group and $R_1$ and $R_2$ are halogen.

14. An electrophotographic material comprising a conductive support layer and a photoconductive insulating layer, the latter comprising a compound having the formula

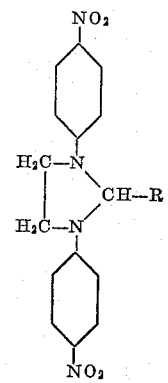

in which R is an aryl group.

15. A photographic reproduction process which comprises exposing a supported, electrostatically charged, photoconductive insulating layer to light under a master and developing the resulting image with an electroscopic material, the photoconductive layer comprising at least one compound corresponding to the formulas:

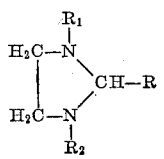

and

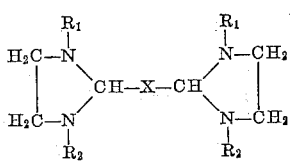

in which R is selected from the group consisting of hydrogen, alkyl, alkenyl, aralkyl, aralkenyl, aryl, and heterocyclic groups, $R_1$ and $R_2$ are phenyl groups and X is selected from the group consisting of arylene, a heterocyclic group and a bis-aryl-amine group.

16. A process according to claim 15 in which the photoconductive layer contains a dyestuff sensitizer.

17. A process according to claim 15 in which the photoconductive layer contains an organic colloid.

18. A photographic reproduction process which comprises exposing a supported, electrostatically charged, photoconductive insulating layer to light under a master and developing the resulting image with an electroscopic material, the photoconductive layer comprising a compound having the formula

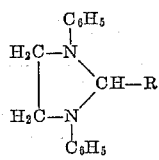

in which R is an alkyl group.

19. A photographic reproduction process which comprises exposing a supported, electrostatically charged, photoconductive insulating layer to light under a master and developing the resulting image with an electroscopic material, the photoconductive layer comprising a compound having the formula

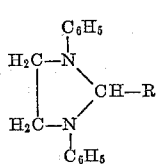

in which R is an alkenyl group.

20. A photographic reproduction process which comprises exposing a supported, electrostatically charged, photoconductive insulating layer to light under a master and developing the resulting image with an electroscopic material, the photoconductive layer comprising a compound having the formula

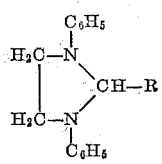

in which R is an aralkyl group.

21. A photographic reproduction process which comprises exposing a supported, electrostatically charged, photoconductive insulating layer to light under a master and developing the resulting image with an electroscopic material, the photoconductive layer comprising a compound having the formula

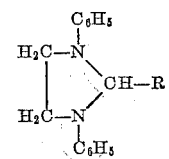

in which R is an aralkenyl group.

22. A photographic reproduction process which comprises exposing a supported, electrostatically charged, photoconductive insulating layer to light under a master and developing the resulting image with an electroscopic material, the photoconductive layer comprising a compound having the formula

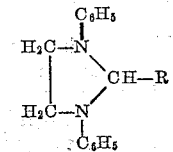

in which R is an aryl group.

23. A photographic reproduction process which comprises exposing a supported, electrostatically charged, photoconductive insulating layer to light under a master and developing the resulting image with an electroscopic material, the photoconductive layer comprising a compound having the formula

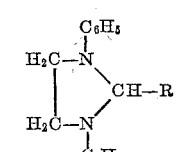

in which R is a heterocyclic group.

24. A photographic reproduction process which comprises exposing a supported, electrostatically charged photoconductive insulating layer to light under a master and developing the resulting image with an electroscopic material, the photoconductive layer comprising a compound having the formula

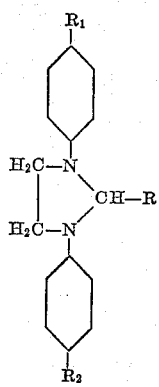

in which R is an aryl group and $R_1$ and $R_2$ are lower alkyl groups.

25. A photographic reproduction process which comprises exposing a supported, electrostatically charged, photoconductive insulating layer to light under a master and developing the resulting image with an electroscopic material, the photoconductive layer comprising a compound having the formula

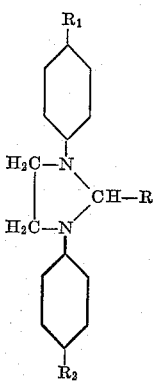

in which R is a heterocyclic group and $R_1$ and $R_2$ are lower alkyl groups.

26. A photographic reproduction process which comprises exposing a supported, electrostatically charged, photoconductive insulating layer to light under a master and developing the resulting image with an electroscopic material, the photoconductive layer comprising a compound having the formula

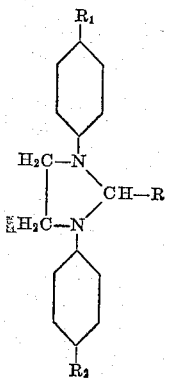

in which R is an aryl group and $R_1$ and $R_2$ are halogen.

27. A photographic reproduction process which comprises exposing a supported, electrostatically charged, photoconductive insulating layer to light under a master and developing the resulting image with an electroscopic material, the photoconductive layer comprising a compound having the formula

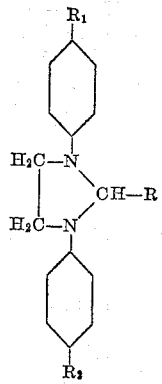

in which R is a heterocyclic group and $R_1$ and $R_2$ are halogen.

28. A photographic reproduction process which comprises exposing a supported, electrostatically charged, photoconductive insulating layer to light under a master and developing the reuslting image with an electroscopic material, the photoconductive layer comprising a compound having the formula

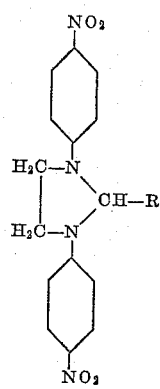

in which R in an aryl group.

References Cited in the file of this patent
UNITED STATES PATENTS

| | | |
|---|---|---|
| 2,069,807 | Heckert | Feb. 9, 1937 |
| 2,368,222 | Kendall et al. | Jan. 30, 1945 |
| 2,476,832 | Donia | July 19, 1949 |
| 2,546,169 | Salvin | Mar. 27, 1951 |
| 2,639,990 | Kendall et al. | May 26, 1953 |
| 2,663,636 | Middleton | Dec. 22, 1953 |
| 2,704,286 | Baum | Mar. 15, 1955 |
| 2,726,246 | Trosken | Dec. 6, 1955 |
| 2,750,379 | Hanslick et al. | June 12, 1956 |
| 2,793,192 | Leavitt | May 21, 1957 |
| 2,901,348 | Dessauer et al. | Aug. 25, 1959 |
| 2,939,789 | Dersch et al. | June 7, 1960 |

FOREIGN PATENTS 760,335  Great Britain _____ Oct. 31, 1956

OTHER REFERENCES

Winslow et al.: Journ. Amer. Chem. Soc., vol. 77, pages 4751–4756 (September 20, 1955). (Copy in Sci. Lib.)

Nelson: Journal of the Optical Society of America, vol. 46, No. 1, pages 10–13 (January 1956).

Metcalfe et al. Journal of the Oil and Colour Chemists Association, vol. 39, No. 11, pages 845–847, November 1956.

Lyons et al.: Journal of the Chemical Society (London), August 1957, pages 3648–3660.